United States Patent [19]

Speit et al.

[11] Patent Number: 4,520,115

[45] Date of Patent: May 28, 1985

[54] HIGH ABSORBANCE PB-CONTAINING GLASS FOR CATHODE RAY TUBE PICTURE SCREEN

[75] Inventors: Burkhard Speit, Mainz-Mombach; Karl Mennemann, Taunusstein; Georg Gliemeroth, Mainz-Finthen, all of Fed. Rep. of Germany

[73] Assignee: Schott Glaswerke, Mainz, Fed. Rep. of Germany

[21] Appl. No.: 519,650

[22] Filed: Aug. 2, 1983

[30] Foreign Application Priority Data

Aug. 2, 1982 [DE] Fed. Rep. of Germany ....... 3228826

[51] Int. Cl.$^3$ .............................................. C03C 3/10
[52] U.S. Cl. ....................................... 501/60; 313/480; 252/478; 501/56; 501/57; 501/58; 501/59; 501/61; 501/62; 501/63; 501/64; 501/74; 501/75; 501/76; 501/78
[58] Field of Search ................. 501/56, 57, 58, 59, 501/60, 61, 62, 64, 63, 74, 75, 76, 78; 252/478; 313/480

[56] References Cited

U.S. PATENT DOCUMENTS

| | | | |
|---|---|---|---|
| 1,632,534 | 6/1927 | Long . | |
| 1,703,391 | 2/1929 | Eckert . | |
| 2,025,099 | 12/1935 | Gelstharp | 501/74 |
| 2,477,329 | 7/1949 | DeGier et al. | 501/64 |
| 2,747,105 | 5/1956 | Fitzgerald et al. | 250/108 |
| 2,782,319 | 2/1957 | McAlpine et al. | 250/83 |
| 2,856,303 | 10/1958 | Armistead | 501/62 |
| 2,901,366 | 8/1959 | Smith et al. | 501/62 |
| 2,948,992 | 2/1958 | Oldfield et al. | 501/69 |
| 3,356,579 | 1/1964 | Harrington | 501/60 |
| 3,369,961 | 2/1968 | Dalton et al. | 501/62 |
| 3,382,393 | 9/1966 | Schwartz | 313/480 |
| 3,422,298 | 1/1969 | De Gier | 501/64 |
| 3,461,078 | 8/1969 | Veres | 252/301.6 F |
| 3,464,932 | 9/1968 | Connelly et al. | 501/62 |
| 3,805,107 | 4/1974 | Boyd | 252/478 |
| 3,987,330 | 10/1976 | Shell | 252/478 |
| 4,065,696 | 12/1977 | Steierman | 313/480 |
| 4,065,697 | 12/1977 | Steierman | 313/480 |
| 4,174,490 | 11/1979 | Van Erk et al. | 313/480 |
| 4,179,638 | 12/1979 | Boyd et al. | 313/480 |
| 4,376,829 | 3/1983 | Daiku | 501/64 |
| 4,390,637 | 6/1983 | Daiku | 501/64 |

FOREIGN PATENT DOCUMENTS

| | | | |
|---|---|---|---|
| 451565 | 8/1943 | Belgium . | |
| 50-29618 | 3/1975 | Japan | 501/64 |
| 55-113644 | 9/1980 | Japan | 313/480 |
| 7301999 | 8/1973 | Netherlands | 501/64 |
| 734444 | 8/1955 | United Kingdom . | |
| 870101 | 6/1961 | United Kingdom . | |
| 946030 | 1/1964 | United Kingdom . | |
| 1123857 | 8/1968 | United Kingdom . | |
| 1231378 | 5/1971 | United Kingdom . | |

OTHER PUBLICATIONS

Brewster et al., J. of Am. Ceramic Soc., 35, #10, Oct. 1952, pp. 259–264.
International Tables for X-ray Crystallography, Kynoch Press, Birmingham, England, 1962, pp. 175–195.
Brewster et al., J. of Am. Ceramic Soc., 35, #8, 194–197, (1952).
Victoreen, J. of Applied Phys., 20, (1949), pp. 1141–1147.

Primary Examiner—Mark L. Bell
Attorney, Agent, or Firm—Millen & White

[57] ABSTRACT

These objects have been attained by providing highly absorbent lead containing alkali metal silicate glasses for cathode ray tube image screens, having a linear absorption coefficient $\mu$ of $>30$ cm$^{-1}$ (0.6 Å) and with a high resistance to discoloration by X-ray and electron radiation, comprises, in weight percent:

| | |
|---|---|
| $SiO_2$ | 20–65% |
| $P_2O_5 + B_2O_3 + Al_2O_3$ | 0–30% |
| $Li_2O$ | 0–5% |
| $Na_2O$ | 0–10% |
| $K_2O$ | 0–15% |
| $MgO + CaO + ZnO$ | 0–15% |
| $SrO$ | 0–20% |
| $BaO$ | 0–40% |
| $PbO$ | 5–60% |
| $ZrO_2$ | 0–10% |
| $CeO_2$ | 0.1–5% |
| Other Components | 0–20%. |

14 Claims, No Drawings

HIGH ABSORBANCE PB-CONTAINING GLASS FOR CATHODE RAY TUBE PICTURE SCREEN

BACKGROUND OF THE INVENTION

The present invention concerns lead-containing glasses with high X-ray absorptivity useful in the manufacture of image screens for cathode ray tubes with high operation potentials, (e.g., 30–60 kV), in particular for television, monitor and projection tubes.

For the production of image screens, glasses with a high permeability in the visible spectral range, with a high X-ray absorption and with a high resistance to brown coloration with regard to the undesirable browning effect which often results from electron and X-ray irradiation, are required.

It is known that, in cathode ray tubes, upon the impact of electrons on the phosphorus layer of the front plate or part of the image screen, there is generated a secondary emission of X-rays with a higher or lower intensity. Maximum permissible emission values were established at 0.5 milliroentgen per hour (mr/h) at a distance of 5 cm from the plate of the image screen. This is becoming even more critical a requirement, since the operating potential of the tubes is constantly increasing.

For example, higher operating potentials require television projection means which project the image onto a wall or a screen. Consequently, the emission of X-rays and electrons is very much higher than in conventional image screen devices. For this energy range, the $\gamma$ absorbers PbO, $ZrO_2$, SrO, BaO and ZnO are the most effective elementary oxides.

Even though the high absorption ability of PbO is known, it has become the usual practice (see, for example, U.S. Pat. No. 3,464,932, U.S. Pat. No. 3,805,107, U.S. Pat. No. 4,179,638, U.S. Pat. No. 3,987,330, JP No. 8 100 9462, JP No. 8 100 9463, U.S. Ser. No. 122,505, U.S. Ser. No. 141,960 and GB No. 879,101), to provide adequate $\gamma$ absorption in alkali silicate base glasses by means of SrO, most often, however, by a combination of SrO+BaO in quantities of 0–20% by weight. $ZrO_2$ is contained in most cases in amounts of 0–10% by weight. A linear X-ray absorption coefficient ($\mu$) of 25 cm$^{-1}$ at a wavelength of 0.6Å is obtained in alkali silicate glasses by approximately 15% by weight of SrO. Higher coefficients are obtained by the addition of BaO and $ZrO_2$ or ZnO, respectively. In addition, $CeO_2$ is combined in quantities of 0.05–1.0% by weight, with amounts of up to 2% of $TiO_2$ to increase resistance to discoloration.

Furthermore, it is known to use glasses with high lead contents for the cone and the neck of a cathode ray tube, but the same is not true for image screens. PbO is cited in the aforementioned patents with a maximum content of 0–5%, but if often absent entirely. Excessive amounts of this oxide were considered in the prior art as the sole cause of strong electron browning.

The aforementioned glasses pose the following difficulties if the requirement of $\mu(0.6Å) > 30$ cm$^{-1}$ is to be satisfied.

(a) With strontium contents higher than 14% by weight, the formation of strontium silicate crystals may be observed during the cooling of the glass melt. A combination of Sr with Ba and Zr is again not free of a tendency to crystallize. This occurs particularly during reheating, e.g., for the fusing of the cone and the screen, both parts are heated to the processing temperature for approximately 1–2 min. in a narrow melting range.

(b) To obtain a satisfactory result in the fusing of the cone and the screen, in addition to comparable expansion coefficients, a similar viscosity behavior of the glasses at the temperature is also required. Due to the high $\gamma$ exposure of the cone, these glasses consist of at least 15–30% PbO, which causes a higher expansion and a relatively flat configuration of the viscosity curve with temperature. The alkali silicate glasses with SrO, BaO and $ZrO_2$, on the other hand, are relatively "short" glasses, compared with the corresponding lead glasses.

(c) As a result of the high alkali and alkaline earth content, respectively, these glasses exhibit an acid resistance (DIN 12116) that is poor for a technical glass.

(d) These glasses strongly attack conventional, industrial glass tank materials, such as ZAC 1711, 1681 and Jargal M. This significantly restricts any large scale industrial production.

(e) The absorption coefficient cannot be raised over 50 cm$^{31\ 1}$ without having to accept a severe deterioration of certain properties, such as chemical stability, crystallization, etc., so that the desire of industry for thinner front panes cannot be satisfied.

SUMMARY OF THE INVENTION

It is, accordingly, an object of the present invention to provide glasses, whereby the abovementioned problems are eliminated or significantly ameliorated and which in addition are highly resistant to discoloration.

Upon further study of the specification and appended claims, further objects and advantages of this invention will become apparent to those skilled in the art.

These objects have been attained by providing highly absorbent lead containing alkali metal silicate glasses for cathode ray tube image screens, having a linear absorption coefficient $\mu$ of $>30$ cm$^{-1}$ (0.6Å) and with a high resistance to discoloration by X-ray and electron radiation, comprising, in weight percent:

| | |
|---|---|
| $SiO_2$ | 20–65% |
| $P_2O_5$ + $B_2O_3$ + $Al_2O_3$ | 0–30% |
| $Li_2O$ | 0–5% |
| $Na_2O$ | 0–10% |
| $K_2O$ | 0–15% |
| MgO + CaO + ZnO | 0–15% |
| SrO | 0–20% |
| BaO | 0–40% |
| PbO | 5–60% |
| $ZrO_2$ | 0–10% |
| $CeO_2$ | 0.1–5% |
| Other Components | 0–20% |
| preferably: | |
| $SiO_2$ | 30–60% |
| $P_2O_5$ + $B_2O_3$ + $Al_2O_3$ | 0–15% |
| $Li_2O$ | 0–5% |
| $Na_2O$ | 1–8% ⎫ |
| | ⎬ 5–20% |
| $K_2O$ | 4–12% ⎭ |
| MgO + CaO + ZnO | 0–8% |
| SrO + BaO | 0–40% ⎫ |
| | ⎬ 20–60% |
| PbO | 5–50% ⎭ |
| $ZrO_2$ | 0–8% |
| $CeO_2$ | 1.0–3.5% |

Particularly preferred glasses contain elementary oxides with high X-ray absorptions (0.6Å), such as, for example, $La_2O_3$, $Y_2O_3$, $Bi_2O_3$ and SnO in quantities of 0–15% by weight in total; or contain the chalcogens S, Se, Te in quantities of 0–5% by weight in total; or contain the halogens F, Cl, Br and $SO_4{}^{2-}$ in amounts of 0.2–3% by weight in total; or contain, in addition to $TiO_2$ in quantities of 0–5% by weight, rare earths with atomic numbers 58–91, in amounts of 0–3% by weight in total; or contain the oxides $Fe_2O_3$, $Cr_2O_3$, MnO, NiO and CoO in quantities of 0–1% by weight in total; or contain the fining agents $As_2O_3$ or $Sb_2O_3$ in qunatities of 0–2% by weight in total.

DETAILED DESCRIPTION

The most important properties of the novel glasses include the following:
electrical resistivity at 300° C.: at least $10^8 \Omega$ cm;
coefficient of thermal expansion $\alpha$ at 20°–300° C.: no more than $100 \times 10^7/°C$.;
transformation temperature: 420° to 500° C.;
processing temperature: 900° to 1000° C.;
linear absorption coefficient for X-rays at 0.6Å: at least $60 \text{ cm}^{-1}$;
density: more than $3.0 \text{ g/cm}^3$.

The glasses of this invention are characterized by high X-ray absorption with a good resistance to browning via exposure to electron and X-ray exposure.

The determination of the X-ray absorption coefficient was based on the method described in the standard work:

Clearinghouse for Federal Scientific and Technical Information
National Bureau of Standards
U.S. Department of Commerce
Springfield, VA 22151 and: Bastick R. E., *J. of the Soc. of Glass Tech.* 42, (1958) S 70 T-83 T

For the testing of $\alpha$ browning, an X-ray installation (180 KV, 5 mA), was used. With a focal distance of 55 mm, the time of irradiation of the series of tests reported herein always was 19.1 h. Electron browning was investigated with a special instrument having a fanned e-beam at an accelerating potential of 30–50 kV. In a cathode spot of 2 $cm^2$, in each case, four specimens were always tested in a direct comparison. To avoid local charges, the specimens were covered with a 0.02 mm thick aluminum foil. During the experiment, the charge flow per hour from the specimens was 0.0068 A sec/$cm^2$ (test current 15 $\mu A$).

With irradiating times of 20 h under these conditions, dark brown, homogeneous browning spots were produced for glass specimens having unfavorable compositions.

The glasses according to this invention may be melted in ZAC tanks (also with supplemental electric heating), and in Jargal M and in acid crucible material on an industrial scale. On a smaller scale, melting vessels of precious metals are also suitable.

The glasses according to this invention contain in addition to the X-ray absorbers Pb, Ba, Sr, Zr, Zn, La, Y and Sn or Bi, also $CeO_2$ in consideration of the absorption behavior that is specific for these glasses in the visible spectral range. That is, the amounts of each of these ingredients must be selected to ensure that the visible spectral properties of the overall glass satisfy the end use requirements.

Preferably, $CeO_2$ is present in concentrations of 1–3% by weight. As is known, $CeO_2$ reduces $\alpha$ browning or eliminates it in Pb glasses. The cerium concentration in conventional "face plates" used heretofore without Pb or with only small Pb contents, is in most cases less than 1% by weight. The high cerium contents in the glasses according to this invention are thus necessary not only for the prevention of $\alpha$ browning, but also to reduce electron browning. The effect of $CeO_2$ is supported in the prevention of electron browning by the halogens F, Cl and Br. By means of their reducing action in the glass melt, these contribute to the improvement of transmission by displacing the $Ce^{III} \leftrightarrow Ce^{IV}$ equilibrium in the direction of $Ce^{III}$. Increased amounts of $Ce^{III}$ cations in favor of $Ce^{IV}$ cations are desired because the $Ce^{IV}$ cations absorb in the UV-VIS region and color especially the glasses with ions of a great polarization like Pb, Ba and La, yellow-brown.

By the addition of rare earths to the Pb-alkali-silicate glasses of this invention, in particular Nd, Eu, Gd, Tb and Yb in the range of 0.01–0.5% by weight in total, a further improvement in the electron browning behavior may be obtained. Because of raw material costs, the amount added is preferably restricted to 0.5% total by weight, maximum.

The glasses according to this invention may further contain S, Se, Te, Ti, in quantities of 0.01–5% by weight in total, which again in cooperation with $CeO_2$, the halogens and rare earths has a positive effect on electron browning. The precise amount in a given case must also take into account the effect on readily reduced components, such as for example PbO and, thus, must be correlated with the base glass. In the case of Se, Te and Ti, furthermore, the amount must also take into account the expected inhibiting effect on transmission of these elements. These effects and the precise amounts to be added in a given case can be determined conventionally in consideration of the end glass desired (e.g., Pb content, transmission, etc. and other desired properties), perhaps with a few routine preliminary experiments.

The alkali metal ratio Li:Na:K is further of importance in the glasses according to the invention with respect to the transmission regression caused by electron radiation. Thus, in glasses with approximately 20% by weight of PbO a ratio of Li:Na:K = 1:3–4:12–16 has been found to be particularly favorable, again precise amounts being conventionally determinable perhaps with a few routine preliminary experiments.

It is usual to ask for the different applications of these glasses a special glass color expressed in color co-ordinates specific to a particular fluorescence emission from inside the tube and to a defined observer. To get these specific co-ordinates the coloring agents like $Fe_2O_3$, $Cr_2O_3$, MnO, NiO, CoO and/or CuO are added up to 0–1% by weight in total.

In the glasses of the invention, thus, by means of the cooperation of a plurality of glass components which must also be routinely correlated with respect to good transmission, crystallization and homogeneity of the final glass desired as explained above, the electron browning of Pb-containing alkali silicate glasses is reduced to an acceptable degree, comparable to a $\alpha$ browning.

Without further elaboration, it is believed that one skilled in the art can, using the preceding description, utilize the present invention to its fullest exgent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

For 40 kg of glass, there are mixed:

| | |
|---|---|
| quartz flour | 20 300 g |
| barium carbonate | 11 670 g |
| minium Pb$_3$O$_4$ | 7 500 g |
| lithium carbonate | 500 g |
| sodium carbonate | 850 g |
| sodium fluoride | 40 g |
| sodium chloride | 380 g |
| sodium sulfate | 180 g |
| potassium carbonate | 4 400 g |
| potassium bromide | 500 g |
| cerium(IV) oxide | 1 200 g |

The homogeneous mixture is melted in a ZAC crucible in small portions at temperatures between 1300° and 1360°. Following a subsequent refining of several hours at temperatures between 1360° and 1400°, the melt is homogenized with a ZAC agitator (or a precious metal agitator). The melt free of bubbles is then further homogenized for approximately 1 h at 1320° to be free of cords, using an agitator, is poured at 1250°–1280° C. into a mold and slowly cooled from 510° C. in a cooling furnace over 150 h uniformly to room temperature.

The glasses described in the table were prepared fully analogously.

| Composition | 1 | 2 | 3 | 4 | 5 | 6 | 7 | 8 | 9 | 10 |
|---|---|---|---|---|---|---|---|---|---|---|
| SiO$_2$ | 55.02 | 50.47 | 39.0 | 43.3 | 50.66 | 55.11 | 52.05 | 59.56 | 52.3 | 32.2 |
| B$_2$O$_3$ | — | — | — | — | | | | | 3.0 | |
| Al$_2$O$_3$ | 0.9 | — | | — | | | | | — | 3.50 |
| P$_2$O$_5$ | — | 0.9 | — | | | | | | | — |
| Li$_2$O | 0.8 | 0.6 | | — | 0.5 | 0.5 | 0.5 | 0.5 | — | |
| Na$_2$O | 2.7 | 2.9 | 2.3 | 2.3 | 1.9 | 1.65 | 1.7 | 1.5 | 1.5 | 1.3 |
| K$_2$O | 6.5 | 7.8 | 7.5 | 8.5 | 8.0 | 7.3 | 6.8 | 7.5 | 8.5 | 6.6 |
| PbO | 5.1 | 8.5 | 12.9 | 16.1 | 18.3 | 19.0 | 19.3 | 27.3 | 27.3 | 48.4 |
| MgO | — | — | | | | | — | | 3.0 | — |
| CaO | — | — | | | | | 2.0 | | | — |
| SrO | 16.1 | 4.3 | | | | — | | | | |
| BaO | 7.7 | 10.1 | 34.8 | 26.0 | 17.0 | | 14.25 | 7.7 | | Zn 2.5 |
| ZnO | — | — | | | | | | | | Sn 1.1 |
| SnO | — | — | | | | | | | | |
| CeO$_2$ | 2.5 | 2.0 | 3.0 | 3.0 | 3.0 | 2.5 | 2.5 | 3.0 | 3.0 | 0.7 |
| TiO$_2$ | 0.1 | — | — | — | | 0.1 | 0.2 | | 0.1 | — |
| ZrO$_2$ | — | 8.5 | — | — | | — | | | 1.0 | 2.4 |
| TeO$_2$ | — | 0.2 | 0.5 | 0.5 | | | — | 0.1 | — | — |
| Y$_2$O$_3$ | — | 3.0 | | — | 5.0 | — | | | | |
| Yb$_2$O$_3$ | — | 0.1 | | | | | 0.25 | | | |
| La$_2$O$_3$ | — | — | | 0.3 | 7.9 | — | | | | |
| F | — | 0.05 | | 0.3 | — | 0.05 | | | 0.3 | 0.3 |
| Cl | 0.2 | 0.3 | | | 0.30 | 0.3 | 0.3 | | | |
| Br | 0.3 | 0.2 | | 0.34 | 0.34 | — | | 0.34 | | |
| S | 0.08 | 0.08 | | | | 0.2 | 0.1 | | | |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A highly absorbent lead-containing alkali metal silicate glass useful for cathode ray tube image screens, having a linear X-ray absorption coefficient $\mu$ of >30 cm$^{-1}$ (0.6Å), and a high resistance to discoloration by X-ray and electron radiation, consisting essentially of, in weight percent:

| | |
|---|---|
| SiO$_2$ | 30–60% |
| P$_2$O$_5$ + B$_2$O$_3$ + Al$_2$O$_3$ | 0–15% |
| Li$_2$O | 0–5% |
| Na$_2$O | 1–2.9% } 5–10.8% |
| K$_2$O | 4–8.5% |
| MgO + CaO + ZnO | 0–8% |
| SrO + BaO | 0–40% } 20–60% |
| PbO | 5–50% |
| ZrO$_2$ | 0–8% |
| CeO$_2$ | 1.0–3.5% |
| and 0–20% in total of | |
| La$_2$O$_3$ + Y$_2$O$_3$ + Bi$_2$O$_3$ + SnO | 0–15% |
| S + Se + Te | 0–5% |
| F + Cl + Br + SO$_4$ | 0–3% |
| TiO$_2$ | 0–5% |
| rare earth metal oxides atomic numbers 58–91 | 0–3% |
| Fe$_2$O$_3$ + Cr$_2$O$_3$ + MnO + NiO + CoO | 0–1% |
| As$_2$O$_3$ + Sb$_2$O$_3$ | 0–2%. |

2. A glass of claim 1 containing an amount of La$_2$O$_3$, Y$_2$O$_3$, Bi$_2$O$_3$ or SnO up to 15% by weight in total.

3. A glass of claim 1 containing an amount of S, Se or Te up to 5% by weight in total.

4. A glass of claim 1 containing an amount of F, Cl, Br or SO$_4{}^{2-}$ 0.2–3% by weight in total.

5. A glass of claim 1 containing an amount of TiO$_2$ up to 5% by weight, and an amount of a rare earth with an atomic number of 58–91, up to 3% by weight in total.

6. A glass of claim 1 containing an amount of Fe$_2$O$_3$, Cr$_2$O$_3$, MnO, NiO or CoO up to 1% by weight in total.

7. A glass of claim 1 containing an amount of As$_2$O$_3$ or Sb$_2$O$_3$ up to 2% by weight in total.

8. A glass of claim 1 having the following properties:
electrical resistivity at 300° C.: at least 10$^8$ Ω cm;
coefficient of thermal expansion $\alpha$ at 20°–300° C.: no more than 100×10$^7$/°C.;
transformation temperature: 420° to 500° C.;
processing temperature: 900° C. to 1000° C.;

linear absorption coefficient for X-rays at 0.6Å: at least 60 cm$^{-1}$;

density: more than 3.0 g/cm$^3$.

9. A glass of claim 1 wherein the amount of CeO$_2$ is 1–3% of weight.

10. A glass of claim 1 wherein the weight ratio Li:Na:K is 1:3–4:12–16.

11. An image plate for CRT's consisting essentially of a glass of claim 1 and having a high resistance to browning by irradiation with electrons and X-rays.

12. A glass of claim 1, wherein the amount of PbO is 12.9–50 wt %.

13. A glass of claim 1, wherein the amount of CeO$_2$ is 2.0–3.5%.

14. A glass of claim 1, wherein the amount of SrO is 0–14%.

* * * * *